US010857698B2

(12) United States Patent
Linnemann et al.

(10) Patent No.: US 10,857,698 B2
(45) Date of Patent: Dec. 8, 2020

(54) METHOD FOR MANUFACTURING A RUBBER PELLET, A RUBBER PELLET AS WELL AS A PRODUCT MANUFACTURED FROM SUCH RUBBER PELLET

(71) Applicant: Genan Holding A/S, Viborg (DK)

(72) Inventors: Lars Linnemann, Ry (DK); Carsten Sigvert, Vejle (DK)

(73) Assignee: Genan Holding A/S, Viborg (DK)

( * ) Notice: Subject to any disclaimer, the term of this patent is extended or adjusted under 35 U.S.C. 154(b) by 27 days.

(21) Appl. No.: 16/306,668

(22) PCT Filed: Jun. 1, 2017

(86) PCT No.: PCT/DK2017/050182
§ 371 (c)(1),
(2) Date: Dec. 3, 2018

(87) PCT Pub. No.: WO2017/207009
PCT Pub. Date: Dec. 7, 2017

(65) Prior Publication Data
US 2019/0291304 A1  Sep. 26, 2019

(30) Foreign Application Priority Data

Jun. 3, 2016  (EP) ..................................... 16172816

(51) Int. Cl.
| B29B 17/00 | (2006.01) |
| B29B 17/04 | (2006.01) |
| C08J 3/12 | (2006.01) |
| B29K 21/00 | (2006.01) |
| B29L 31/00 | (2006.01) |
| B29L 30/00 | (2006.01) |
| C08L 17/00 | (2006.01) |

(52) U.S. Cl.
CPC .......... *B29B 17/0404* (2013.01); *B29B 17/00* (2013.01); *B29B 17/0036* (2013.01); *B29B 17/0042* (2013.01); *C08J 3/12* (2013.01); *B29K 2021/00* (2013.01); *B29L 2030/00* (2013.01); *B29L 2031/7092* (2013.01); *B29L 2031/7324* (2013.01); *C08J 2309/00* (2013.01); *C08J 2317/00* (2013.01); *C08J 2321/00* (2013.01); *C08L 17/00* (2013.01); *Y02W 30/62* (2015.05)

(58) Field of Classification Search
USPC .......................................................... 521/40
See application file for complete search history.

(56) References Cited

U.S. PATENT DOCUMENTS 2,809,944 A   10/1957  Sverdrup
3,468,974 A    9/1969  Elgin

FOREIGN PATENT DOCUMENTS

JP          2007119677 A      5/2007

*Primary Examiner* — Terressa Boykin
(74) *Attorney, Agent, or Firm* — James Creighton Wray

(57) ABSTRACT

The invention relates to a method for manufacturing a pellet, comprising a) providing residual rubber powder from i rubber disintegration process; b) providing a pelletizing system, including a pelletizer and a cooling device; c) feeding the residual rubber powder as at least part of a feed material, into a pelletizer; d) providing the rubber powder in an amount between 50% and 100%; i) applying a pressure to the residual rubber for a predetermined process duration; f) releasing the pelletized rubber and cooling the pelletized rubber at a cooling rate dependent on the operational temperature of the pelletizer.

12 Claims, 3 Drawing Sheets

METHOD FOR MANUFACTURING A RUBBER PELLET, A RUBBER PELLET AS WELL AS A PRODUCT MANUFACTURED FROM SUCH RUBBER PELLET

This application claims the benefit of European Application No. 16172816.7 filed Jun. 3, 2016 and PCT/DK2017/050182 filed Jun. 1, 2017, International Publication No. WO 2017/207009, which are hereby incorporated by reference in their entirety as if fully set forth herein.

FIELD OF THE INVENTION

The present invention relates to the area of recycling rubber, in particular but not exclusively recycling of rubber from end of life tires (ELT).

BACKGROUND OF THE INVENTION

It is known to recycle rubber, nylon and other materials from for example tires by cutting the tires into smaller pieces and reusing the pieces for various purposes.

The smaller pieces are attractive for various filling purposes, however from the disintegration process, e.g. a cutting and milling process, a large amount of residual rubber powder remains which is less attractive as this is difficult to handle and does not meet the requirements for the known uses of recycled rubber material.

U.S. Pat. No. 3,468,974 discloses a method of recycling thermoplastic material from tire cord, containing a major proportion of nylon and/or other thermoplastic material. By removing most of the rubber layer from the tires, the tire cord is accessible. The moulding compositions containing nylon and rubber for the scrape tire cord material and by pelleting the plastic and elastomeric material, the recycling of the material will be ready for further use. The pellets contain a small amount of rubber and at the same time the process leaves a larger amount of residual rubber powder when processing the tires.

JP2007119677 discloses a method of recycling tires, using vulcanized synthetic rubber material from the recycled tires, where the particles are size 30-100 mesh. The particles are stirred and mixed with particles from thermoplastic synthetic resin moulded material. The mixture is 10-30 wt % particle from recycled tires, and 70-90 wt % particles from thermoplastic synthetic resin moulded material. Still the process of extracting the rubber from the tires and comminution of the particles will leave a large amount of residual rubber dust when recycling the rubber.

U.S. Pat. No. 2,809,944 discloses a process for reclaiming vulcanized natural and/or synthetic rubber to provide vulcanizable products, which are mouldable into e.g. products of specified hard rubber. The products of hard rubber are based on comminute vulcanized rubber. The process of extracting the rubber from the tires and the comminution of the particles will leave a large amount of residual rubber dust in the process of recycling the hard rubber.

In general, the standard definition of powder of the residual rubber material within the rubber recycling industry covers particles in a varying range of sizes.

The excess material in the form of residual rubber powder hereby forms a waste material which may be taken care of through the usual waste handling channels, e.g. burning or depositing.

Obviously this is a less than optimal situation, where an improvement is needed.

Object of the Invention

The objective of the present invention is to provide a method for further refining the recycling process for residual rubber material by enabling an increased use of an excess material in the form of residual rubber powder. It is further an objective to provide a rubber pellet containing a high concentration of rubber.

Description of the Invention

According to the invention, the objective is achieved through a method for manufacturing a rubber pellet containing a high concentration of rubber, comprising
a. providing residual rubber powder from a rubber disintegration process;
b. providing a pelletizing system, including a pelletizer and a cooling device;
c. feeding the residual rubber powder as at least part of a feed material, into a pelletizer
d. providing the rubber powder in an amount between 50% and 100%,
e. applying a pressure to the residual rubber for a predetermined process duration;
f. releasing the pelletized rubber and cooling the pelletized rubber at a cooling rate dependent on the operational temperature of the pelletizer.

By providing residual rubber powder from a grinding process, and providing a pelleting system, which includes a pelletizer and a cooling device, the method results in rubber pellets containing a high concentration of rubber. By feeding the residual rubber powder into the pelletizer and applying a pressure to the residual rubber powder for a predetermined process duration, the residual rubber powder is shaped to rubber pellets. After the pressurizing process, the rubber pellets are released, and the cooling process of the rubber pellet starts. The cooling rate is dependent on the operational temperature of the pelletizer. The rubber pellets product is now finished.

By using the otherwise as waste, residual rubber powder to create larger size rubber pellets, it is ensured that the possible uses of the rubber powder increases and that the rubber powder can be used in other processes for recycling the rubber material. As a result, less waste material is accumulated and eventually the environmental influence from the waste material is reduced.

The residual rubber powder may be provided with a grain size essentially in the span of 0.0 mm and 1.0 mm. Often the residual rubber powder is further categorised in two subcategories, i.e. 0.0-0.2 mm and 0.2-0.8 mm powder. Due to the novel process, it is not necessary to separate the rubber powder in two or more categories, as the rubber powder may be used for pelletizing in the entire range.

In order to enhance the vulcanization, the method may comprise adding sulphur to the rubber powder prior to the introduction into the pelletizer. The additional sulphur will further enable the vulcanization process by making the material less sticky and enhance the mechanical characteristics of the rubber product.

The invention provides the rubber powder being provided in an amount between 50% and 100% of the pelletized rubber.

To ensure the quality of the rubber product, the method is capable of pelletizing different amounts of residual rubber powder of different purity, and where the process is depending on the finished product being produced. It is therefore important to ensure a high amount of residual rubber powder with a high quality to ensure a uniform density.

Because of the method, the finished product of rubber pellets can be provided in different hardness, tensile strength and viscosity for further process.

The invention also provides a further possible aspect, where textile fibers, binding additives, vulcanizing chemicals, rubber granulate, minerals or further organic and/or inorganic chemicals are added to the residual rubber powder to form the feed material.

By mixing the residual rubber material with other material, the rubber exhibits unique physical and chemical properties, which can be used in the later process of other products, based on the fabricated rubber pellets.

Furthermore, the invention is directed to a method, where the pelletizer is heated to an operational temperature of at least 120 degrees Celsius prior to the pelletizing process initiation, where-after the pelletizer temperature is maintained at a level resulting in a pellet temperature below 180 C, preferably below 170 C.

The invention also provides a further possible aspect, where the method comprises adding water to the pelletized rubber immediately after the pelletizing process, in order to initialise cooling of the pelletized rubber.

In order to control the vulcanization process and avoid continuation of the process after departure of the rubber pellets from the pelletizer the method may comprise adding water to the pelletized rubber immediately after the pelletizing process. Keeping the temperature below a critical temperature is essential as a too high temperature may initialize self-combustion of the rubber.

When adding water to the rubber pellets this is preferably done in an amount suitable to reduce the temperature to a level below a certain critical temperature and allowing excess water to evaporate. It is essential to dose the water in an amount leaving dry pellets.

To improve water evaporating, it is preferred to use water in the form of small droplets, more similar to mist than to an actual 'shower', by using nozzles. The water mist has an efficient cooling effect and creates a mist curtain cutting off the oxygen supply to the rubber pellets.

The invention further relates to a rubber pellet manufactured by a process as defined above, the rubber pellet comprising a vulcanized residual rubber powder, where the vulcanized residual rubber powder comprises a majority of rubber particles of a size between 0.0 mm and 1.0 mm, where the pellet has a length between 5 mm and 80 mm, preferably between 10 mm and 40 mm and a thickness between 2 mm and 10 mm.

The rubber pellet may further comprise textile fibers, binding additives, vulcanizing chemicals, rubber granulate, minerals or further organic and/or inorganic chemicals.

The pellets can be provided in different shapes, hardness, tensile strength and viscosity suitable for further process.

In a further aspect of the invention a product manufactured from pellets according to the invention is foreseen, where the pellets are joined by double bindings on the surface of the pellets.

Such product may be manufactured by a method comprising; providing rubber pellets of a desired size, adding a binder (such as PUR) and curing the combined pellet and binder mixture in a desired mould shape.

Other areas of use of pellets comprise the steel industry, where the rubber pellets may be used as an additive forming a layer on top of a melt in a melting furnace, which layer due to high carbon content will bind oxygen from the steel forming $CO_2$.

DETAILED DESCRIPTION OF THE INVENTION

Figure 1:
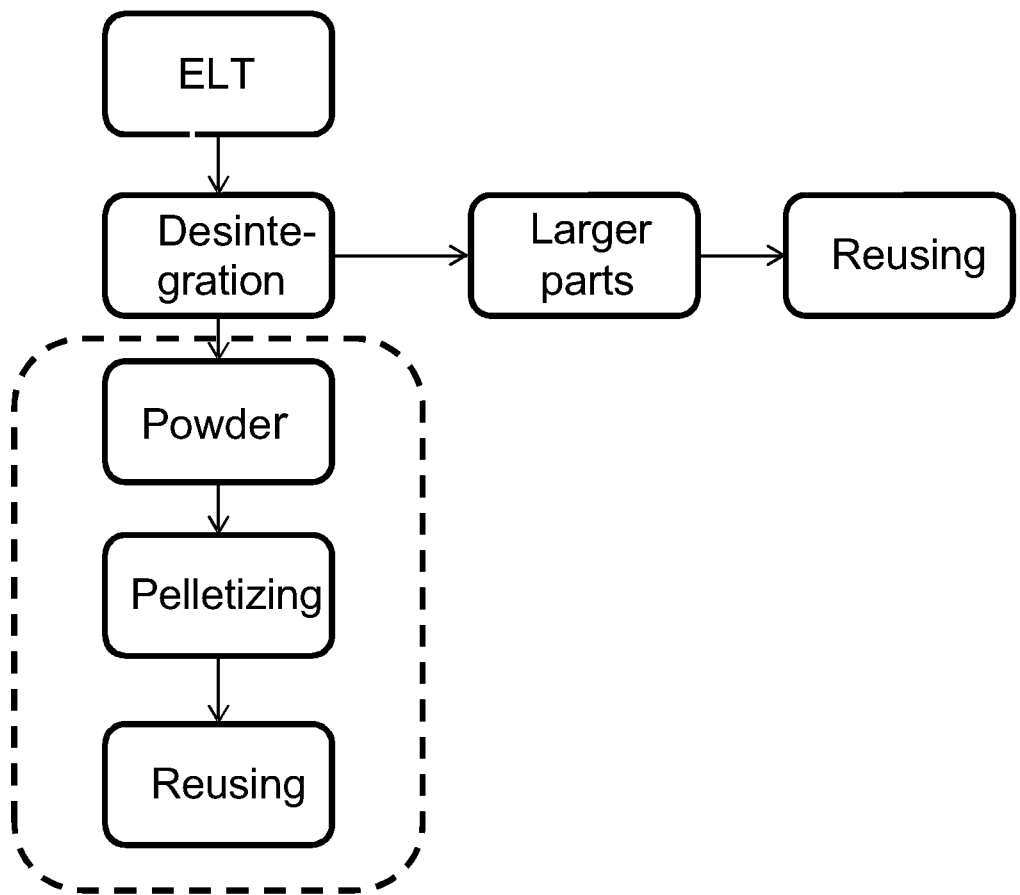
FIG. 1 schematically shows the process related to recycling rubber.

The invention relates to the area of producing rubber pellets from rubber powder and granulate generated by grinding of ELT (End of Life Tires) and other rubber products, such as rubber conveyors, for use in the industrial applications, e.g. in the steel industry, and as shock pads.

Industrial applications of the rubber pellets may be several. The typical application may be in industrial processes where a need exists for adding a carbon rich additive capable of removing $O_2$. One example is the steel industry, which will be described in more detail in the following.

The Steel Industry Use

Today coke, coal or other carbon containing material are added to the melting pots used in the steel industry for producing cast iron. This provides for a desired layer on the melt while at the same time removing $O_2$ by conversion to $CO_2$.

Rubber pellets with a carbon content of more than 70% can substitute the existing technology. This is an environmentally sound solution as the product is recycled and therefore does not involve a burning of fossil carbon.

The Shock Pad Use

Shock pads are used as a substrate for artificial lawns, on play grounds, in fitness gyms, on roof surfaces and a number of other applications. Today these shock pads are manufactured from a rubber granulate bound by a glue, typically a PUR glue (Poly Urethane Resin)

By use of rubber pellets of a certain length (typically between 10 and 40 mm) it is possible to reduce the bulk density and hence reduce the amount of glue that needs to be used for binding the product. The result is that the material amount is reduced and hence the cost of the final product.

Further the rubber pellets have the advantage that they are overlapping and hence have more binding area in relation to neighbouring rubber pellets. This further increases the strength of the shock pad and reduces the risk of tearing of the shock pad when adding a load to the shock pad.

When grinding a tire, three different material groups are generated. These are steel, textile and rubber. The steel and the textile components are sorted from the rubber fraction, which is successively ground to a number of different size fractions. Some of these size fractions are less sought after in the market, where these typically are the smaller size fractions.

By manufacturing larger pellets from these smaller fractions the market will increase as the larger size rubber fractions are much more sought after.

The rubber powder is expected to contain a certain amount of accelerator and sulphur components that are not used during the original vulcanisation. At the same time a number of double bindings are present in the surface of the rubber powder. Subject to high pressure the powder is squeezed in such a manner that the surfaces are brought in contact with each other. The high temperature that arises as a consequence of the rubber powder friction with the steel surface of the pelletiser matrix will vulcanise the squeezed powder to a joined pellet.

The production of the pellets is done by squeezing the rubber powder through a pelletizer matrix having one or more holes or profiles with a size in the range 1-40 mm. As the material is subject to a significant pressure and a high temperature, caused by the friction, the rubber particles are cured together to form a solid pellet. A knife arrangement may be provided in case a reduction of the pellets to a smaller size in desired. Further additives, such as organic or inorganic substances may be added to change the characteristics of the pellets. The latter may alter the possible uses of the pellets and also have an effect on the desirability of the pellets and hence the price.

The Vulcanization Process

Vulcanization is a process where raw rubber is modified from a viscous and mouldable substance to a form stable elastic material. This is achieved through adding of heat whereby sulphur is forming cross-links or bridges between the polymer chains and hence forms an interconnected network. It is only a small fraction of the double-bonds in the polymer that are used in the vulcanization process. Therefore there are numerous double-bonds present in the surface of the rubber powder, which can form crosslinks with other rubber powder particles. A small fraction of sulphur is still present in the powder, which is the accelerator for the crosslinking formation, and further addition of sulphur may increase the speed of the crosslinking formation.

From FIG. 1 the process related to rubber recycling is schematically shown, The disintegration of the used rubber, such as tires, is as such well known and practised by many entities worldwide. The part of the process related to the invention is indicated by the area surrounded by the dashed line. The powder material and possibly additional material and substances as described previously are pelletized as likewise described and hence a product with a number of advantages is obtained.

Figure 2:
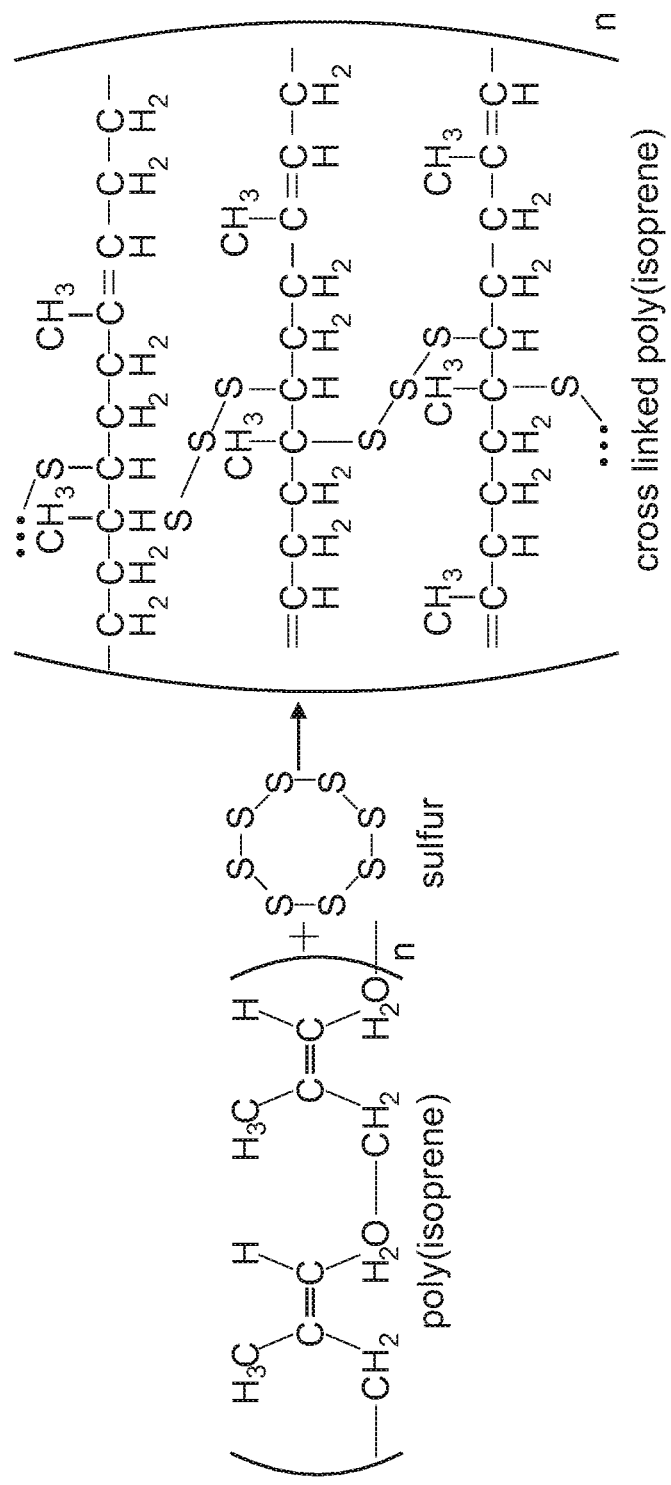
FIG. 2 shows the chemical reaction.

In FIG. 2 the crosslinking process is illustrated. A number of chains of poly(isoprene) are crosslinked by the addition of sulphur.

Figure 3:
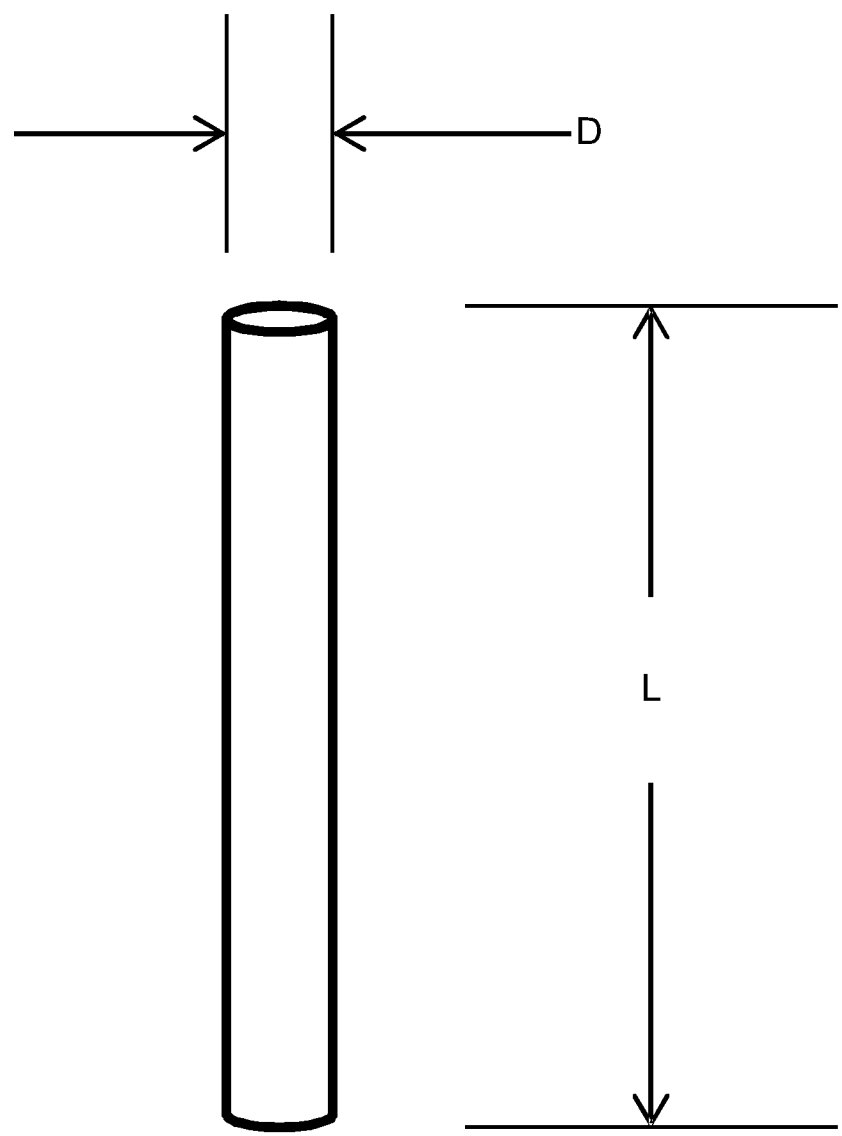
FIG. 3 schematically shows a pellet according to the invention

The pellet obtained by the process is depicted in FIG. 3. The pellet is shown with a length L and a diameter D. L and D may vary as described in the previous description and will be dictated by the preferred use of the pellet. Although a diameter has been indicated, which will normally indicate a circular cross section it should be appreciated that other cross sectional shapes could be selected without deviating from the invention. The cross sectional measure D would then indicate a measure taken on the cross section of such other shape.

A number of tests have been carried out to demonstrate the feasibility of the technology. These are commented on in the following:

| | | Test 1: | | | |
|---|---|---|---|---|---|
| Powder | Pellet size | Surface temp. | Output | Bulk density | Fines < 0.2 mm |
| 0.2-0.8 | 3.5 × 6 mm | 156 C. | 109 kg/h | 0.486 g/cm3 | 0.5% |

| | | Test 2 | | | |
|---|---|---|---|---|---|
| Powder | Pellet size | Surface temp. | Output | Bulk density | Fines < 0.2 mm |
| 0.0-0.8 | 3.5 × 4 mm | 140 C. | 120 kg/h | 0.475 g/cm3 | 3.3% |

| | | Test 3 | | | |
|---|---|---|---|---|---|
| Powder | Pellet size | Surface temp. | Output | Bulk density | Fines < 0.2 mm |
| 0.2-0.8 | 3.5 × 4 mm | 148 C. | 160 kg/h | 0.497 g/cm3 | 1.9% |

| | | Test 4 | | | |
|---|---|---|---|---|---|
| Powder | Pellet size | Surface temp. | Output | Bulk density | Fines < 0.2 mm |
| 0.0-0.8 | 3.5 × 40 mm | 150 C. | ? kg/h | 0.374 g/cm3 | 0.2% |

It should be appreciated that the term pelletizer is to be understood broadly. On form of pelletizer may be a traditional rotational pelletizer, where matrices are shaped according to the desired pellet size. An extruder may be a further option for applying the necessary pressure to the rubber powder and pressing the rubber through the matrix to obtain the pellets.

It should further be appreciated that the pellets may have a wider use than in the shock pads as described and in the steel industry as described.

The invention claimed is:

1. A method for manufacturing a pellet, comprising
   a. providing residual rubber powder from a rubber disintegration process;
   b. providing a pelletizing system, including a pelletizer and a cooling device;
   c. feeding the residual rubber powder as at least part of a feed material, into a pelletizer
   d. providing the residual rubber powder in an amount between 50% and 100%,
   e. applying a pressure to the residual rubber powder for a predetermined process duration;
   f. releasing the pelletized rubber, and
   g. cooling the pelletized rubber at a cooling rate dependent on the operational temperature of the pelletizer to a level below a certain critical temperature.

2. A method according to claim 1, where the rubber powder is added to the feed material with a grain size essentially between 0.0 mm and 1.0 mm.

3. A method according to claim 2, where further textile fibers, binding additives, vulcanizing chemicals, rubber granulate, minerals or further organic and/or inorganic chemicals are added to the rubber powder to form the feed material.

4. A method according to claim 1, where the method comprises heating the pelletizer to an operational temperature of at least 120 degrees Celsius.

5. A method according to claim 1, further comprising adding sulphur to the feed material prior to the introduction into the pelletizer.

6. A method according to claim 1, where the pelletizer temperature is maintained at a level resulting in a pellet temperature below 180 C.

7. A method according to claim 1, the method comprising adding water to the pelletized rubber immediately after the pelletizing process in order to initialize cooling.

8. A method according to claim 6, where water is added in an amount suitable to reduce the temperature to a level below said certain critical temperature and allowing excess water to evaporate.

9. A pellet manufactured by a process as defined above, the pellet characterized by a vulcanized rubber powder, where the vulcanized powder comprises rubber particles of a size between 0.00 mm and 1.0 mm, where the pellet has a length between 5 mm and 80 mm.

10. A pellet according to claim 9, where the pellet further comprises textile fibers, binding additives, vulcanizing chemicals, rubber granulate, minerals or further organic and/or inorganic chemicals.

11. A product manufactured from pellets according to claim 9, where the pellets are joined together by adding a binder.

12. The product of claim 11 wherein the binder is PUR.

\* \* \* \* \*